CONDITION FOR TRANSMITTANCE

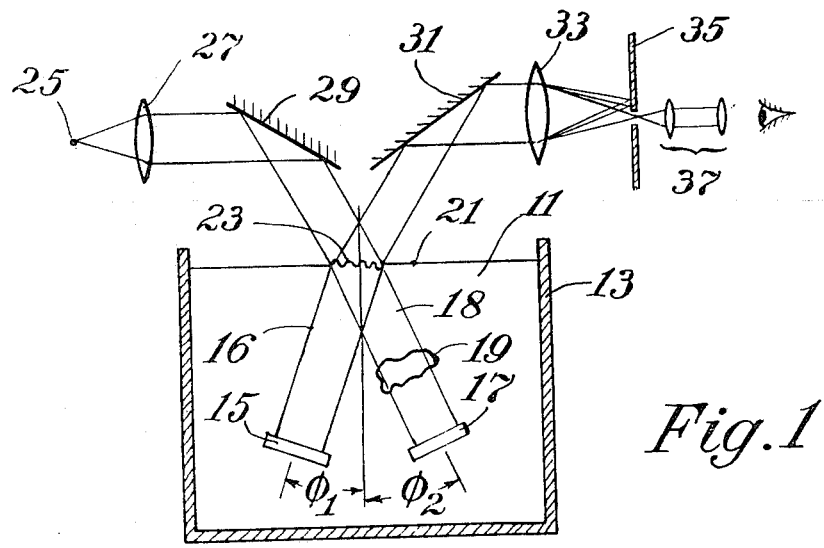
Fig. 1
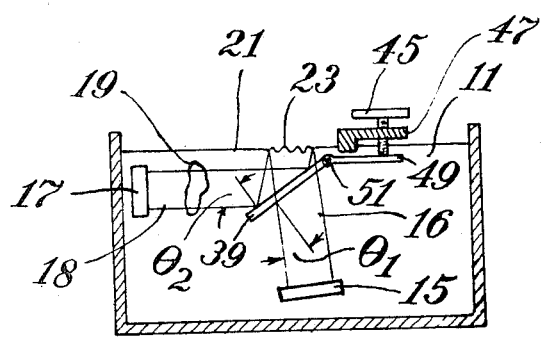
Fig. 2
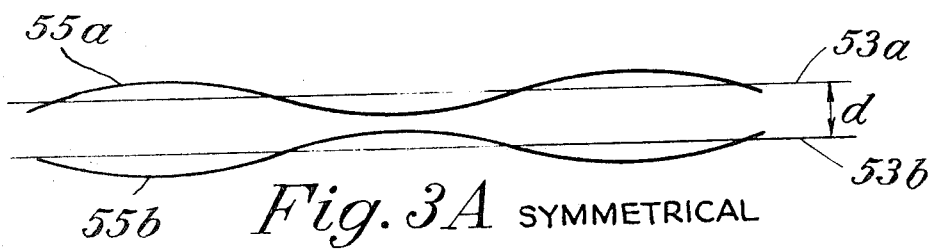
Fig. 3A SYMMETRICAL
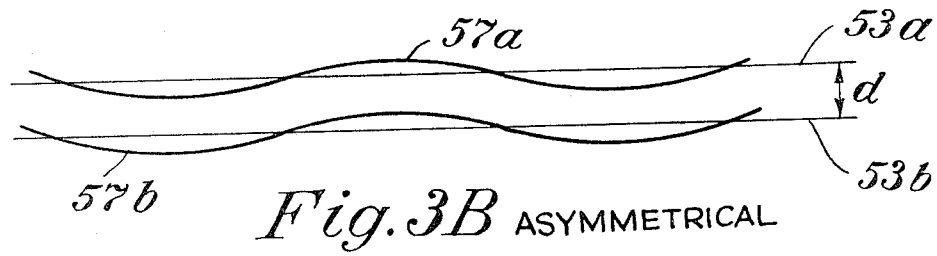
Fig. 3B ASYMMETRICAL

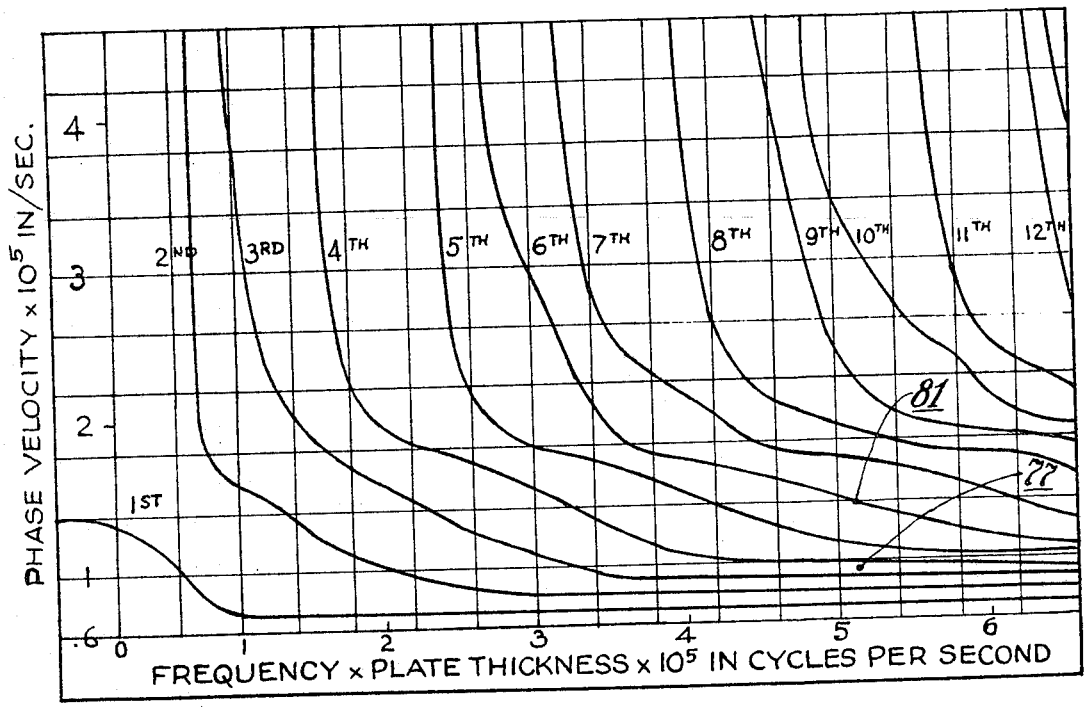
*Fig. 4A*  SYMMETRICAL MODES IN BRASS
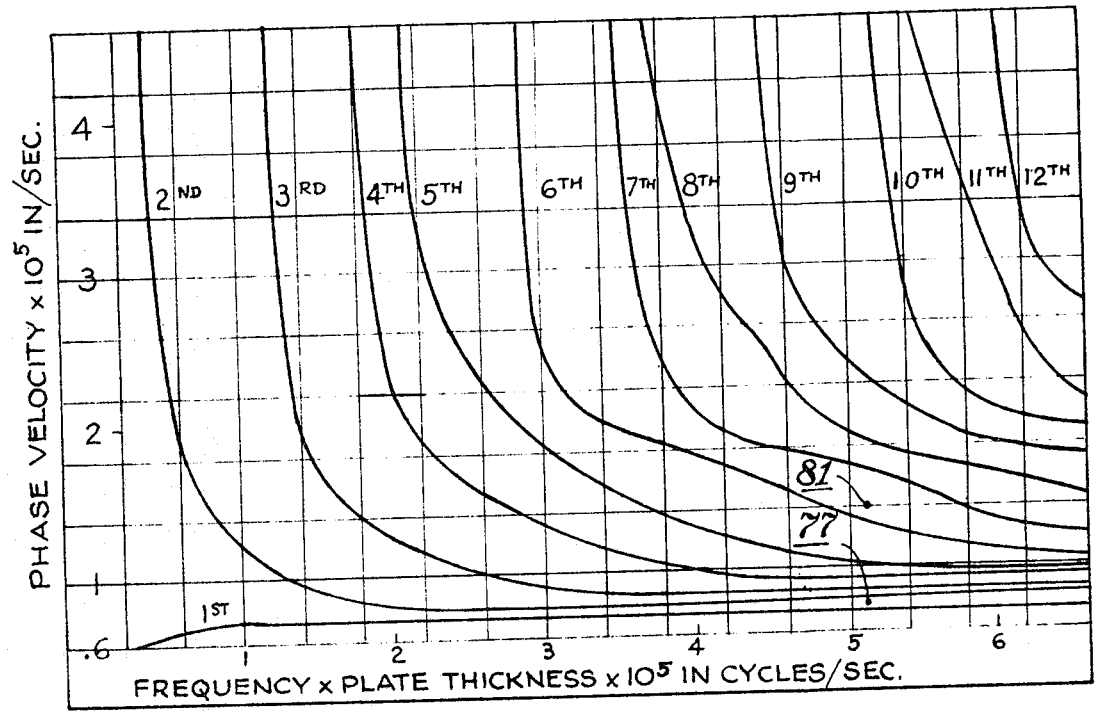
*Fig. 4B*  ASYMMETRICAL MODES IN BRASS

CONDITION FOR REFLECTANCE

United States Patent Office 3,561,257
Patented Feb. 9, 1971

3,561,257
ULTRASONIC BEAM COMBINER
IN HOLOGRAPHY
Byron B. Brenden, Richland, Wash., assignor to Holotron
Corporation, Wilmington, Del., a corporation of Delaware
Filed Mar. 6, 1968, Ser. No. 710,892
Int. Cl. G01n 29/04
U.S. Cl. 73—67.5                                14 Claims

ABSTRACT OF THE DISCLOSURE

A method and apparatus for combining two or more beams of ultrasonic energy, including a beam combining plate in an embodiment where one beam is reflected and a second beam is transmitted. When utilized in ultrasonic holography, two ultrasonic beams are so combined to interfere at a suitable holographic detecting surface to allow more flexibility in the placement of an object under investigation.

BACKGROUND OF THE INVENTION

This invention relates generally to ultrasonic holography and more specifically to a method and apparatus for combining two ultrasonic beams to form a holographic interference pattern.

The present invention is related to that disclosed in application Ser. No. 569,914, filed Aug. 3, 1966. The present invention is an improvement over the methods and apparatus disclosed and claimed therein.

The above noted application describes a method and apparatus for creating a hologram by the interference of two compressional waves which preferably, although not necessarily, oscillate at ultrasonic frequencies. In a preferred embodiment described in that application, two ultrasonic beams at substantially the same frequency (i.e., the beams are mutually coherent so that an interference pattern is formed at a detecting surface) are directed from within a liquid medium and with a small angle between them toward the surface of the liquid medium where the two beams form a standing wave interference pattern. Available sources of coherent ultrasonic energy are utilized to produce the two interfering ultrasonic beams. An object to be investigated is submersed in the liquid in the path of one of the ultrasonic beams. The resulting standing wave interference pattern at the surface of the liquid contains three-dimensional wave information pertaining to the object. This interference pattern may then be used as a hologram in conjunction with an optical system to recreate an image which corresponds to the object. Alternatively, a permanent hologram may be made on film according to the techniques of optical holography.

A significant application of this method of ultrasonic holography is the non-destructive examination of solid objects. If the object under examination is placed in the path of one of the two interfering ultrasonic beams, the resulting hologram will contain information as to the transparency of the various parts of the object to a compressional wave of the ultrasonic frequency range.

The two ultrasonic beams should interfere at a detecting surface with an angle between them to result in a proper standing wave pattern. The optimum combining angle for the two beams depends on their intensities, frequency, and related parameters. To provide this angle places restrictions upon the placement of the object, since it must be penetrated by or reflect one of the two interfering beams. It is desirable to be able to place the object in a more convenient location within the medium and independently of this restrictive beam path.

Therefore, it is a primary object of this invention to provide a method and apparatus for combining two or more ultrasonic beams at a detecting surface with the optimum angle between them for a good standing wave interference pattern while giving great flexibility in the directions that the combined ultrasonic beams may originally be propagated.

It is a further object of this invention to provide a method and apparatus for combining two or more ultrasonic beams by reflecting one or more of the beams, but not affecting the other beam.

SUMMARY OF THE INVENTION

Briefly, these and other objects of the invention are accomplished by the utilization of a thin plate material to reflect one beam while at the same time remaining transparent to a second beam. This allows the angle of the interfering beams to be controlled while giving great flexibility to the direction in which the beams may be originally propagated. Thin sheets of certain materials have natural vibrational modes which may be excited by ultrasonic frequencies under certain conditions to act both as a reflector and transmitter of two incident ultrasonic beams. Utilizing the characteristics of such materials to control the travel of ultrasonic beams is itself a useful result of varied possible applications.

When utilized in ultrasonic holography, a thin plate is positioned to reflect one or more beams onto a hologram detecting surface for interference with one or more other beams. Such a configuration generally requires that the reflecting plate be transparent to the second set of beams, since it generally must be placed in the path of these beams in order to obtain the proper merging angle between them at the detecting surface. The result is a high quality standing wave hologram at the detecting surface where the two ultrasonic beams interfere, plus added flexibility in locating the object under investigation. Also, the object may be placed effectively closer to the hologram detecting surface for an image of improved quality. The standing wave hologram may then be read by reflecting light from it or a permanent hologram may be made for later examination.

By utilizing this beam combiner in ultrasonic holography, the beam in which the object is placed may be propagated along and very close to the surface of a liquid medium, thus requiring only a small part of the specimen under examination to be submersed in the liquid. Use of such a beam combiner has the further advantage that the relative intensities of the two ultrasonic beams may be controlled by fine adjustment of the angle of incidence of the two beams upon the plate, thus further improving the quality of the resulting hologram.

While the invention is distinctly pointed out and claimed in the appended claims, the preferred embodiments of the invention, together with further objects and advantages thereof, may best be understood with reference to the following description taken in conjunction with the accompanying drawings.

BRIEF DESCRIPTION OF THE DRAWINGS

FIG. 1 shows basic configuration of ultrasonic holography of which this invention is an improvement;

FIG. 2 shows the use of the ultrasonic beam combiner of this invention and the resulting relocation of the object that is made possible;

FIGS. 3A and 3B show a thin plate in its natural vibrational modes;

FIGS. 4A and 4B graphically show the conditions required to place the thin sheet into one of its natural vibrational modes;

DESCRIPTION OF THE PREFERRED EMBODIMENTS

Figure 5A:
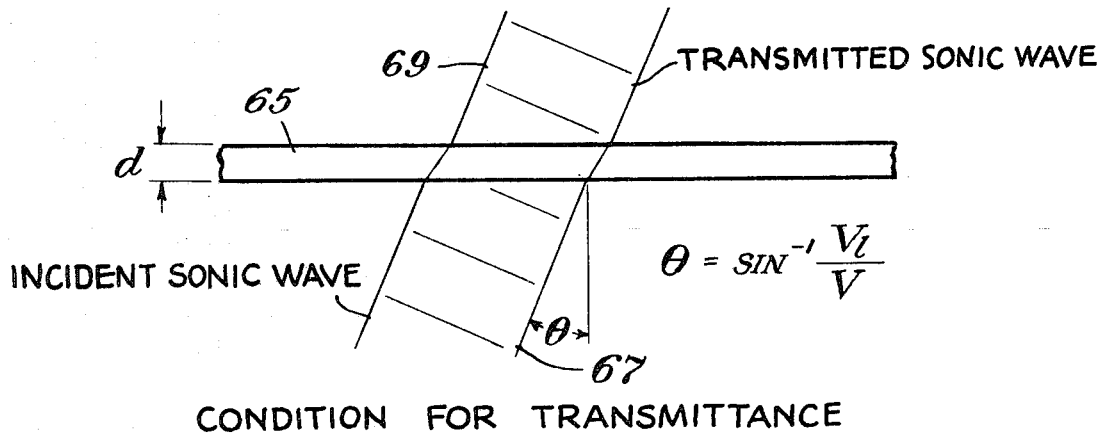
FIGS. 5A and 5B illustrate the conditions necessary for reflectance and transmission of an ultrasonic wave by a thin plate.

In the broadest sense of the invention of ultrasonic holography, the sonic frequencies utilized are not limited to any particular range but include the entire spectrum of compressional wave energy. However, in the more practical embodiments of that invention, it has been found that the higher sonic frequencies (i.e., those considerably above the audible range) are much more desirable than the lower sonic frequencies. For this reason, instead of utilizing the more general term "compressional wave energy," the term "ultrasonic energy" will be utilized in the following description. This should, however, in no way limit the scope of the invention.

Furthermore, the medium in which such "ultrasonic energy" is propagated is referred to in this description as a liquid, since materials in this class are preferred. However, this should not limit the scope of the invention, since any ultrasonic transmitting medium may be utilized which has the physical property which best serves the purpose of the particular embodiment.

Referring to FIG. 1, the basic invention of ultrasonic holography will be briefly described. A liquid 11 in a container 13 provides a medium for transmission of ultrasonic energy. An ultrasonic transducer 17 produces a first beam of ultrasonic energy (object beam) and an ultrasonic transducer 15 produces a second beam of ultrasonic energy (reference beam) which interferes with the object beam at a detecting surface 21 near the surface of the liquid medium 11 to form a standing wave pattern 23. The detector may be an interface between the liquid medium 11 and air, as shown in FIG. 1, or may be an interface between the liquid medium 11 and some other liquid. The object 19 to be examined is placed in the path of the object beam. The frequency and intensity of the ultrasonic beams produced by transducers 15 and 17 are made substantially equal, as are their angles $\phi_1$ and $\phi_2$, in order to produce a stationary standing wave. Also, it has been found that in order to obtain a standing wave interference pattern which will produce an image of high intensity, $\phi_1$ and $\phi_2$ should generally be small, depending upon the frequency of the reference and object ultrasonic beams.

To create the image of the object 19 in real time, electromagnetic radiation is applied to the standing wave pattern or hologram 23 to create diffracted orders which carry the object information. Light is the most practical form of energy used and is shown in FIG. 1 as a point source 25 which is collimated by a lens 27 and reflected by a mirror 29 onto the hologram 23. The incident light is reflected and diffracted from the hologram 23 to form an actual and conjugate image of the object 19. The light is again reflected by a mirror 31 and gathered by a lens 33. A spatial filter 35 may be placed at the focal plane of lens 33 to filter out all but one desired first order diffracted beam. The image carried in this first order diffracted beam is viewed through a suitable optical system 37. This system of ultrasonic holography and variations thereon are described in more detail in the aforementioned copending patent application Ser. No. 569,914. An image may be viewed by focusing the optical system 37 directly upon an image, the method of Ser. No. 569,914, or may be focused upon the hologram 23 for improved image resolution under certain circumstances, the method of a copending application by Byron B. Brenden entitled "Improved Imaging Technique or Ultrasonic Holography," filed simultaneously with the present application, and assigned Ser. No. 710,991.

It can be seen from this general description of ultrasonic holography that the ultrasonic beams 16 and 18 are restricted in the angles they may make with the surface 21 of the liquid medium 11 in order to produce a quality standing wave pattern 23, and this limits the choice of locations for the object 19 under examination. In order to free the location of the object 19 from the directional requirement of object beam 18, it is desirable to be able to direct this beam through the object at a convenient location but still provide for the beam to intersect the liquid surface 21 at the angle required for a quality standing wave pattern.

Referring to FIG. 2, an embodiment of the present invention is shown which provides the desired flexibility. A beam combining sheet or plate 39 is utilized to reflect the object beam 18 from a first side so that this beam will intersect the surface 21 of liquid medium 11 at the proper angle. Since in most applications the plate 39 will be placed in the path of the reference beam 16, it must not affect the propagation of this beam. By use of natural vibrational mode characteristics of the thin sheet beam combining plate 39, this plate can be made transparent to reference beam 16 which strikes a second side of the plate. The result is a standing wave interference pattern 23 which is exactly like that of the basic system shown in FIG. 1.

Referring again to FIG. 2, the thin sheet beam combining plate 39 is transparent or reflective to an incident ultrasonic beam, depending on the angle of incidence. The angle $\theta_1$ must be a "critical angle" which will cause the thin sheet 39 to go into one of its natural vibrational modes and thus appear transparent to the reference beam 16. There are many different critical angles for a given plate, as will be hereinafter described. The angle $\theta_2$, on the other hand, must be some angle other than a critical angle for the plate 39, so that the incident object beam 18 will be reflected.

The characteristics of such thin plates further allows an attenuation control for reference beam 16. If $\theta_1$ is made about one degree away from a critical angle, the plate 39 will be reflective to the reference beam 16. Adjustment of $\theta_1$ between this and a critical angle provides a variable attenuation control for the passage of reference beam 16. Since the relative intensities of the interfering object and reference beams at the surface 21 determines in part the quality of the standing wave pattern 23, this feature becomes another advantage of using a beam combining plate 39.

One method for making the plate 39 rotatable is shown in FIG. 2, where adjustment screw 45 is threaded in support 47 and contacts movement arm 49 which is attached to the beam combining plate 39. Adjustment of screw 45 will cause the plate 39 to pivot about pin 51.

The embodiment of the invention shown in FIG. 2 has the object beam directed parallel to and very near to the surface 21 and is advantageous for investigations of a certain type of an object 19, which cannot be submersed very far into the liquid medium 11.

In order to choose the proper parameters surrounding the use of the beam combining plate 39 in the configuration shown in FIG. 2. some description of the nature of natural vibrational modes in thin sheets is desirable. Natural vibrational modes can be classified as either symmetrical or asymmetrical. FIG. 3A shows the surface deformation of a thin plate when vibrating in a symmetrical mode. Lines 53a and 53b represent the plate edges in its non-deformed state where $d$ represents the plate thickness. When in a symmetrical vibratory mode, the plate surfaces will be deformed at a given instant of time, as shown by lines 55a and 55b. FIG. 3B shows the surfaces deformed when the plate is vibrating in one of its asymmetrical modes, with lines 57a and 57b representing the deformed surface at a given instant of time.

It has been theorized since near the beginning of the twentieth century that thin plates may be excited to vibrate in up to an infinite number of modes of either the symmetrical or asymmetrical type. Equations describing the conditions under which a plate will vibrate in one of its symmetrical modes were mathematically derived relating the phase velocity of the wave associated with a given mode (V), the thickness of the plate ($d$), the frequency of the sonic wave incident upon the plate ($f$) and two constants which depend on the material of which the plate is composed, the sheer wave velocity ($V_S$) and the longitudinal wave velocity ($V_L$).

These equations are as follows:

$$\frac{\tahn \pi f d \sqrt{\frac{V_S^2-V^2}{V_S^2 V^2}}}{\tahn \pi f d \sqrt{\frac{V_L^2-V^2}{V_L^2 V^2}}} = 4 \frac{\sqrt{\left(1-\frac{V^2}{V_L^2}\right)\left(1-\frac{V^2}{V_S^2}\right)}}{\left(2-\frac{V^2}{V_S^2}\right)^2},$$

for $V < V_S < V_L$ (1)

$$\frac{\tan \pi f d \sqrt{\frac{V^2-V_S^2}{V_S^2 V^2}}}{\tahn \pi f d \sqrt{\frac{V_L^2-V^2}{V_L^2 V^2}}} = 4 \frac{\sqrt{\left(1-\frac{V^2}{V_L^2}\right)\left(\frac{V^2}{V_S^2}-1\right)}}{\left(2-\frac{V^2}{V_S^2}\right)^2},$$

for $V_S < V < V_L$ (2)

$$\frac{\tan \pi f d \sqrt{\frac{V^2-V_S^2}{V_S^2 V^2}}}{\tan \pi f d \sqrt{\frac{V^2-V_L^2}{V_L^2 V^2}}} = -4 \frac{\sqrt{\left(\frac{V^2}{V_L^2}-1\right)\left(\frac{V^2}{V_S^2}-1\right)}}{\left(2-\frac{V^2}{V_S^2}\right)^2},$$

for $V_S < V_L < V$ (3)

Similarly, theoretical equations defining the asymmetrical modes of thin plate material in terms of the same parameters are as follows:

$$\frac{\tanh \pi f d \sqrt{\frac{V_S^2-V^2}{V_S^2 V^2}}}{\tahn \pi f d \sqrt{\frac{V_L^2-V^2}{V_L^2 V^2}}} = \frac{1}{4} \frac{\left[2-\frac{V^2}{V_S^2}\right]^2}{\sqrt{\frac{(V_S^2-V^2)(V_L^2-V^2)}{V_S^2 V^2}}},$$

for $V < V_S < V_L$ (4)

$$\frac{\tan \pi f d \sqrt{\frac{V^2-V_S^2}{V_S^2 V^2}}}{\tanh \pi f d \sqrt{\frac{V^2-V_L^2}{V_L^2 V^2}}} = -\frac{1}{4} \frac{\left[2-\frac{V^2}{V_S^2}\right]^2}{\sqrt{\frac{(V_S^2-V^2)(V_L^2-V^2)}{V_S^2 V_L^2}}},$$

for $V_S < V < V_L$ (5)

$$\frac{\tan \pi f d \sqrt{\frac{V^2-V_S^2}{V_S^2 V^2}}}{\tan \pi f d \sqrt{\frac{V^2-V_L^2}{V_L^2 V^2}}} = -\frac{1}{4} \frac{\left[2-\frac{V^2}{V_S^2}\right]^2}{\sqrt{\frac{(V_S^2-V^2)(V^2-V_L^2)}{V_S^2 V_L^2}}},$$

for $V_S < V_L < V$ (6)

FIGS. 4A and 4B show these two sets of equations plotted in graph form for a particular material, in this case, brass. FIG. 4A is a plot of Equations 1 through 3, which reveals that if a plate is operated in any one of the modes represented by the curves shown, the plate will be driven in a natural symmetrical vibrational mode. FIG. 4B is a plot of Equations 4 through 6 for asymmetrical natural vibrational modes. These theoretical equations, and thus the graphs plotted from them, have recently been experimentally verified by others for thin sheets of finite dimensions in a liquid medium. Symmetrical and asymmetrical mode curves may also be plotted from the above equations for other materials, and some are available in various publications.

When an incident ultrasonic beam places the thin plate in either a symmetrical or asymmetrical vibratory mode as defined by the above equations, this plate will appear to be transparent to the beam. When the thin plate is in neither of these natural vibrational states, an incident ultrasonic wave will be completely reflected. The phase velocity of the wave associated with a given vibrational mode of a thin plate, V, has been found to be equal to the velocity of ultrasound in the liquid medium ($V_L$), divided by the sine of the angle the incident sonic wave makes with the perpendicular to the plate ($\theta$). In equation form, we have:

$$\sin \theta = \frac{V_L}{V} \qquad (7)$$

Therefore, the thickness of the plate ($d$), the frequency of the incident ultrasonic wave, and the angle of incidence of this wave with the plate may be chosen to either place the plate in one of its vibrational modes or not to do so, depending on whether it is desired that the incident ultrasonic beam be transmitted through the plate or reflected from it.

Figure 5B:
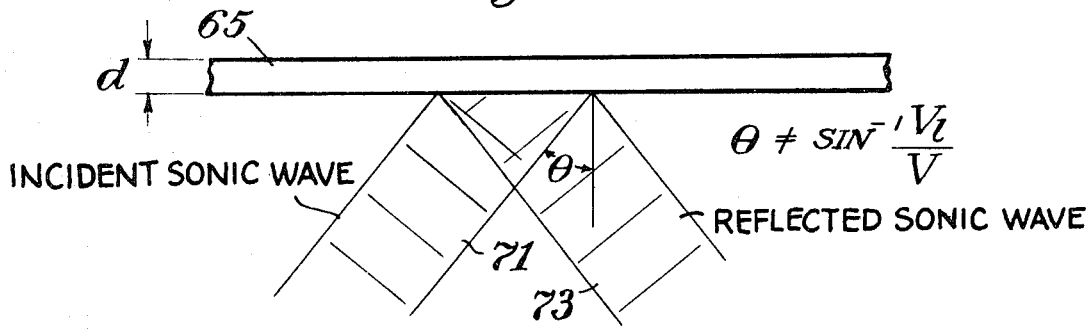

FIG. 5A shows the condition necessary for an incident sonic wave 67 to be transmitted through thin plate 65. FIG. 5B illustrates the condition necessary for incident sonic wave 71 to be reflected from thin plate 65.

Figure 6:
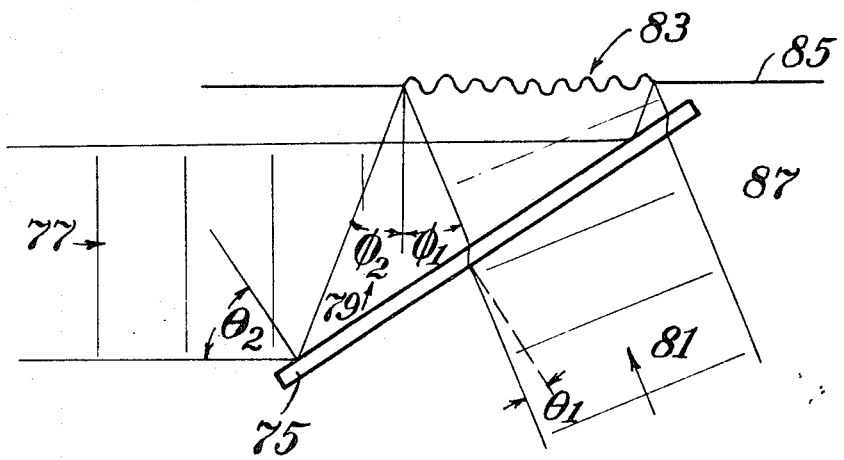
FIG. 6 illustrates in large scale a specific example of the use of a beam combining plate.

Referring to FIG. 6, a specific example of using these vibrational characteristics of thin plates will be given as an ultrasonic beam combiner which may be used to form an ultrasonic hologram. Assume $\phi_1 = \phi_2 = 14°$, since this will give a good standing wave hologram 83 at the detecting surface 85 of liquid medium 87 for the frequency herein chosen. In order to reflect the object beam 77 so that it makes an angle of $\phi_2 = 14°$, this wave must strike the plate 75 at an angle $\theta_2 = 52°$. In order for $\phi_1$ to be equal to 14°, the reference sonic beam 81 must make an angle $\theta_1 = 24°$ with a perpendicular to the plate 75. This specific geometry works well if a brass plate 75 of thickness $d = 0.057$ inch is utilized when the ultrasonic beams 77 and 81 are at a frequency of $9 \times 10^6$ hertz. Equation 7 yields a phase velocity resulting from the object beam 77 of $0.926 \times 10^5$ inches per second and the phase velocity due to the reference beam 81 is $1.4 \times 10^5$ inches per second when the liquid medium 87 is water. Knowing the frequency times plate thickness product ($fd$) of $5.13 \times 10^5$ inch cycles per second, the charts of FIGS. 4A, 4B can be consulted to see if either wave places the plate 75 in one of its natural vibrational modes. When the operating point of the plate 75, due to the incident reference beam 81 is plotted on FIG. 4A, it is seen that the plate will be in its sixth symmetrical vibrational mode, and thus be transparent to the reference beam 81 (point 81). It is also noted that the object beam 77 does not place plate 75 in one of its natural vibratory modes, since the points 77 on curves 4A and 4B do not lie on any of the lines representing natural vibratory modes of plate 75, so the beam 77 is reflected. The parameters described, therefore, give the desired beam combining result wherein a thin plate is transparent to one incident beam yet reflective to a second incident beam.

It should also be noted that if the plate 75 is rotated one or two degrees from the position above determined, it will become reflective to reference sonic wave 81 instead of transparent, since the operating point of the plate due to wave 81 will not lie on a natural vibratory mode curve of FIG. 4A or 4B. By adjusting plate 75 in fractions of degrees from the above-determined position, reference beam 81 may be controllably attenuated, which is a desired result in certain circumstances where the intensity of beams 77 and 81 are not nearly equal.

The beam combiner of the present invention may also be used with more than one frequency for color rendition in ultrasonic holography. Such apparatus utilizes the principle that an object of a specified density has various phase and amplitude modulation properties to an ultrasonic beam passing through it, depending on the frequency of the beam. Referring again to FIG. 1, transducers 15 and 17 may alternately emit pulses at two or more frequencies, thus alternately creating two or more ultrasonic standing wave patterns 23 which, when read out by light source 25, appear to the human eye or to film to occur simultaneously. Light of two or more colors is directed toward hologram 23, which will create a separate diffraction pattern for each light frequency acting upon each separate standing wave pattern. A first order diffracted term for each light frequency is selected and combined to render superimposed multiple images of the object. The resulting combined image will be in several colors which correspond to the various densities of object 19. A more complete description of ultrasonic holography with color rendition may be had by reference to applications Ser. No. 606,368, filed Dec. 30, 1966, and now abondoned, Ser. No. 667,242, filed Sept. 12, 1967, and now abandoned, and Ser. No. 691,253, filed Dec. 18, 1967.

Such color rendition in ultrasonic holography may be had by the configuration of FIG. 2 with the same advantage as above discussed for single frequency ultrasonic holography. However, the beam combining plate 39 must be operated at a point on the curves of FIGS. 4A, 4B that exhibit the same transmittive and reflective characteristics to each frequency. For example, operating in the first symmetrical mode with a brass plate of FIG. 4A, changing the frequency of an incident wave within values so that the frequency times depth product is greater than $1 \times 10^5$, the brass plate 39 will remain in its first natural vibrational mode of a symmetrical nature.

It should be noted that many variations of applicant's invention are possible and that the above described methods of practicing this invention are presented as examples only and are not to limit the true scope of applicant's invention as defined in the following claims.

What is claimed is:

1. A method of combining two beams of ultrasonic energy by employing a thin plate normally reflective to ultrasound but having at least one natural vibrational mode excitable by an ultrasonic beam incident upon said plate at a critical angle therewith, comprising the steps of:
   directing a first ultrasonic beam against a first side of said thin plate at an angle of incidence therewith other than said critical angle, whereby said plate appears reflective to said first beam; and
   simultaneously directing a second ultrasonic beam at a second side of said thin plate at said critical angle of incidence with said plate, whereby said plate appears transparent to said second beam;
   said first and second beams being positioned relative to each other to cause a combining of said beams a distance from said plate on its first side.

2. A method of producing an ultrasonic hologram with with the aid of a thin plate of material that is normally reflective of ultrasonic energy but which transmits substantially all ultrasonic energy incident at a critical angle therewith, comprising the steps of:
   directing a first beam of ultrasonic energy through an ultrasonic energy transmitting medium to an object and thence through said medium to one side of said thin plate at an angle therewith other than said critical angle so that said beam is reflected through said medium to a detecting surface; and
   simultaneously directing through said medium a second beam of ultrasonic energy mutually coherent with said first beam to an opposite side of said plate at a critical angle therewith and thence therethrough to intersect said first beam of ultrasonic energy at a finite angle therewith at said detecting surface, thereby producing an ultrasonic hologram.

3. A method according to claim 2 wherein said first and second beams are propagated through an ultrasonic energy transmitting medium consisting of a liquid, wherein the detecting surface is a surface of said liquid, and wherein said first beam is directed from said object to said thin plate in a path that is substantially parallel to said liquid detecting surface.

4. Apparatus for producing an ultrasonic interference pattern, comprising:
   means for generating and directing a first beam of ultrasonic energy along a first path within an ultrasonic transmitting medium;
   means for generating and directing a second beam of ultrasonic energy along a second path within said medium that passes through at least a portion of said first beam path and thence to intersect a detecting surface, said first and second beams being mutually coherent; and
   means positioned within said medium in the paths of both first and second beams near their intersection for reflecting said first beam toward said detecting surface while transmitting said second beam therethrough so that said first and second beams intersect at said detecting surface with a finite angle between them, thereby forming an ultrasonic interference pattern at said detecting surface.

5. Apparatus according to claim 6 wherein an object to be investigated is placed in the path of said first beam, thereby forming an ultrasonic interference pattern in the nature of an ultrasonic hologram.

6. Apparatus according to claim 4 wherein said means for reflecting said first beam while transmitting said second beam comprises:
   a thin sheet of material of uniform thickness having at least one natural vibrational mode adapted to be excited by an ultrasonic beam incident upon said sheet at a critical angle therewith;
   said sheet being positioned in the path of said second beam at a critical angle therewith and positioned in the path of said first beam at some angle other than a critical angle therewith.

7. Apparatus according to claim 6 wherein said ultrasonic transmitting medium is a liquid and wherein said critical angle between an incident ultrasonic beam and a perpendicular with said sheet may be any angle $$\theta = \sin^{-1} \frac{V_L}{V}$$

where $V_L$ is the velocity of said first and second beams in the liquid medium surrounding said sheet and V is the phase velocity of the wave associated with a natural vibrational mode in said thin sheet, said phase velocity being a multivalued function dependent upon the frequency of the incident wave, the thickness of said sheet, and the material composition of said sheet.

8. Apparatus according to claim 5 including means for rotating said sheet slightly to adjust the angle at which said second beam strikes said sheet to finely control the intensity of said second beam intersecting the detecting surface.

9. Apparatus according to claim 5 wherein said ultrasonic transmitting medium is a liquid, wherein said detecting surface is a surface of said liquid, and wherein said first ultrasonic beam is directed approximately parallel to said liquid surface.

10. Apparatus according to claim 9 wherein said first and second beams are further positioned to intersect said detecting surface at substantially equal and opposite angles with a perpendicular to said liquid surface.

11. Apparatus for producing an ultrasonic hologram capable of rendering an image of an object, comprising:
   an ultrasonic energy transmitting fluid medium;
   a detecting surface coupled to said fluid medium;
   a thin plate submersed in said ultrasonic energy transmitting fluid medium and having at least one natural vibratory mode adapted to be excited by a beam of ultrasonic energy incident upon said plate at a critical angle therewith, said critical angle being dependent upon the wavelength of said ultrasonic beam and the physical characteristics of said plate;

means submersed in said ultrasonic transmitting fluid for producing independent mutually coherent object and reference beams of ultrasonic energy;

said object beam being directed toward the object under investigation and thence toward a first side of said thin plate at an angle of incidence other than a critical angle so that said object beam will be reflected in a direction toward said detecting surface; and said reference beam being incident upon a second side of said plate at a critical angle and thereby appearing to pass through said plate, said reference beam further being positioned for merging with said object beam at a finite angle therewith at said detecting surface, thereby forming an ultrasonic hologram.

12. Apparatus according to claim 11 including means for rotatably adjusting said thin plate for attenuation control of said reference beam.

13. Apparatus according to claim 12 wherein said object beam is further directed approximately parallel to and very near said detecting surface.

14. Apparatus for reconstructing a holographic image of an object, comprising:

a liquid medium;

means for generating and directing within said medium a first ultrasonic beam along a path having said object therein;

means for generating and directing within said medium a second ultrasonic beam along a path that passes through at least a portion of said first beam path and thence to intersect a detecting surface, said first and second beams being mutually coherent;

thin plate means positioned within said medium in the paths of both first and second beams near their intersection for reflecting said first beam toward said detecting surface while transmitting said second beam, said first and second beams additionally being oriented to intersect each other at a finite angle at said detecting surface, thereby forming an off-axis ultrasonic hologram; and optical means for reconstructing an image of said object from said ultrasonic hologram.

References Cited
UNITED STATES PATENTS

| | | | |
|---|---|---|---|
| 2,832,214 | 4/1958 | Trommler | 73—67.6 |
| 3,400,363 | 9/1968 | Silverman | 340—3 |

OTHER REFERENCES

Leith et al.: Holograms: Their Properties and Uses, S.P.I.E. Journal, October/November 1965, pp. 3–6.

RICHARD C. QUEISSER, Primary Examiner

J. P. BEAUCHAMP, Assistant Examiner

U.S. Cl. X.R.

340—5; 350—3.5